UNITED STATES PATENT OFFICE.

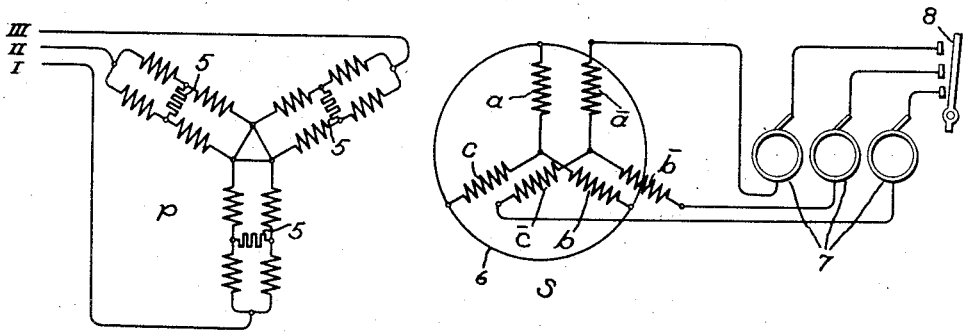

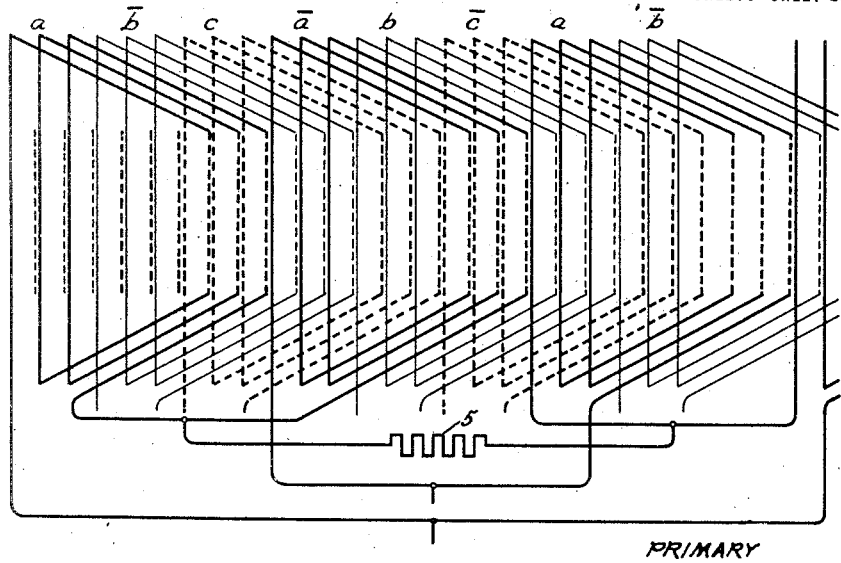
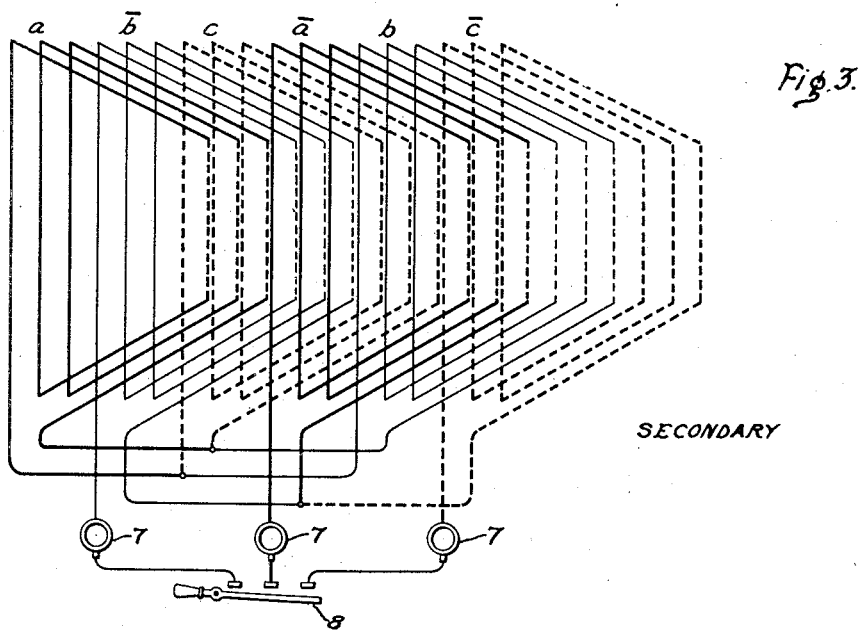
Fig. 3.

CAMPBELL MACMILLAN, OF SCHENECTADY, NEW YORK, ASSIGNOR TO GENERAL ELECTRIC COMPANY, A CORPORATION OF NEW YORK.

INDUCTION-MOTOR.

1,356,933.      Specification of Letters Patent.      Patented Oct. 26, 1920.

Application filed May 31, 1917. Serial No. 171,914.

*To all whom it may concern:*

Be it known that I, CAMPBELL MACMILLAN, a citizen of the United States, residing at Schenectady, county of Schenectady, State of New York, have invented certain new and useful Improvements in Induction-Motors, of which the following is a specification.

My invention relates to induction motors and particularly to multi-speed induction motors. The object of my invention is to provide an improved multi-speed induction motor. More particularly, the object of the invention is to provide an induction motor in which cascade operation can be obtained by a simple change in the electrical connections of the motor.

Various arrangements have been suggested from time to time for obtaining two or more speeds by connecting two induction motors in cascade, and, in order to obtain the well recognized advantages of cascade operation with a less expensive outfit, certain arrangements have heretofore been devised or suggested for combining two cascade-connected motors in one machine. My present invention relates particularly to such a cascade combination embodied in one machine. In carrying out the invention in its complete form, I provide a primary member for producing a polyphase primary magnetic field of a basal number of poles, and, furthermore, arranged to provide a path for induced or secondary currents such as would be produced by a primary magnetic field of twice the basal number of poles. With such a primary member, I employ a secondary member composed of two components arranged so that both components acting together coöperate to provide a locally short-circuited path for the primary magnetic field of the basal number of poles, while one component acting alone is electrically equivalent to two polyphase rotating magnetic fields rotating in relatively opposite directions and of the basal and twice-the-basal number of poles, respectively. When the entire secondary winding coöperates to carry the secondary currents, the motor operates as a normal induction motor with a low resistance short-circuited secondary winding and its efficiency is, accordingly, high. When one component of the secondary winding is electrically disconnected and, therefore, inactive, the motor operates as a cascade combination with a synchronous speed one-third that of its normal synchronous speed, and, if desired, with increased torque.

The novel features of the invention which I believe to be patentable are definitely set forth in the appended claims. The principle of the invention together with the construction and mode of operation of a machine embodying the invention will be best understood from the following description taken in conjunction with the accompanying drawings, in which;

Figure 1 is a diagrammatic representation of the windings of an induction motor embodying the invention; Fig. 2 is an explanatory diagram, and Fig. 3 is a winding diagram.

The primary winding of the so-called three-phase induction motor is usually wound with six phase-belts per pair of poles. This result is obtained by providing per pair of poles two phase-belts in which the direction of current flow is relatively opposite or displaced in phase by 180 electrical degrees for each phase of the source of supply. The currents in adjacent phase-belts are then displaced in phase by 60 electrical degrees, and the winding may be called a 60° six-phase primary winding. Such a winding may be diagrammatically represented by the letters $a, \bar{b}, c, \bar{a}, b, \bar{c}$ appearing in the first row of Fig. 2, thus, $a$ and $\bar{a}$ represent the phase-belts of phase I in which the currents are relatively opposite in direction or 180° out of phase, $b$ and $\bar{b}$ represent the corresponding phase-belts of phase II, and $c$ and $\bar{c}$ the corresponding phase-belts of phase III. All of the phase-belts of the same phase may be electrically connected in any suitable manner, for example, in series, in parallel, or partly in series and partly in parallel, as will be understood by those skilled in the art.

When the secondary winding of the induction motor is phase-wound and substantially a counterpart of the primary winding, the same legends may be used to diagrammatically represent the phase-belts. Thus, while I have employed the top row of legends of Fig. 2 in describing a six-phase primary winding, these legends are herein particularly intended to represent the phase-belts of the secondary or rotor winding for the purpose of explaining my present invention. Four poles of the secondary or rotor winding are thus diagrammatically represented by the first row of letters of Fig. 2, and I have, accordingly, designated this legend-diagram "4-pole, 60°, 6φ rotor." I shall call the phase rotation of this winding counter-clockwise, and in Fig. 2 I have designated this feature by the direction of the arrow.

The second row of legends of Fig. 2 represents the four-pole, 60 degree, 6-phase rotor winding of the first row with alternate phase-belts omitted or electrically disconnected and hence inactive. The phase rotation is the same, that is counter-clockwise, but adjacent phase-belts are 120 electrical degrees out of phase. It will be evident that this second legend-diagram of Fig. 2 represents a four-pole, 120 degree, 3-phase winding. My present invention consists in electrically disconnecting alternate phase-belts of such a secondary winding as represented by the first legend-diagram of Fig. 2 for certain operating conditions of the motor, so that the active phase-belts of the secondary winding are as represented in the second legend-diagram of Fig. 2, and I shall now show what this latter arrangement of the secondary winding is electrically equivalent to.

The third legend-diagram of Fig. 2 is the same as the first and represents a four-pole, 60 degree, 6-phase rotor winding with counter-clockwise phase rotation. The fourth row of legends of Fig. 2 represents an eight-pole, 120 degree, 3-phase rotor winding with clockwise phase rotation. If we assume these two rotor windings to be superimposed, the result is obviously represented by the fifth or last legend-diagram of Fig. 2. It will be observed that this legend-diagram represents a four-pole, 120 degree, 3-phase winding having counter-clockwise phase rotation. It will, therefore, be seen that the winding represented by the last legend-diagram is electrically equivalent to the winding represented by the second row of legends. Thus, the winding represented by the second row of legends may be resolved into the two windings represented by the third and fourth rows of legends, that is to say, the magnetic field produced by the induced currents flowing in the winding represented by the second row of legends is electrically equivalent to two polyphase rotating magnetic fields such as would be produced by currents flowing in the two windings represented by the third and fourth rows of legends. In other words, when alternate phase-belts of an $n$-pole, 60 degree, 6-phase secondary winding are omitted or electrically disconnected, the remaining active phase-belts of this secondary winding may be resolved into two windings, one of which is an $n$-pole winding with the same direction of phase rotation, while the second is a $2n$-pole winding with a phase rotation of the opposite direction.

It is well known that two rotor windings of $n$-poles and $2n$-poles having relatively opposite phase rotation will operate in effect as a cascade or concatenated combination provided a suitable tertiary circuit is provided on the stator for the $2n$-pole rotor winding. In such a cascade combination the $n$-pole rotor winding acts as the secondary winding for the main primary winding of the basal or $n$ poles, while the $2n$-pole rotor winding operates in effect as a primary winding whose secondary or induced currents flow in the tertiary circuit provided on the stator. The synchronous speed of such a cascade combination is one-third synchronous speed with respect to the basal number of poles. The tertiary circuit may be provided by an independent winding on the stator, but I prefer to arrange the main stator or primary winding so as to provide suitable paths for the tertiary currents, that is, the induced currents corresponding to a primary winding of $2n$-poles. The necessary tertiary circuit may thus be provided by parallel circuits in the main primary stator winding provided each circuit has at least one parallel circuit under an adjacent pole. Such an arrangement of the primary winding is described in the U. S. patent to Hunt, Reissue No. 13,354, reissued Jan. 9, 1912.

Fig. 1 of the drawings diagrammatically represents an induction motor embodying my present invention. The primary or stator winding P is a compound winding having two or more parallel paths through which currents may flow to produce a field of the basal number of poles, for example, $n$ poles. Equal potential points of this winding are connected together either directly or through resistances 5 to complete local or independent circuits for an induced current which will flow so as to produce the field of twice the basal number of poles, for example, $2n$ poles. This type of compound winding is described in the aforementioned Hunt patent.

The pitch $p$ of the primary winding P should not be 100 per cent. with respect to $n$ poles, since there would then be no tertiary circuit with respect to $2n$ poles, because the two parallel paths for the short-circuited currents with respect to $2n$ poles would be in the same slots with the currents in the opposite direction, but with a reduced pitch of $p$ per cent., the tertiary circuit has an equivalent pitch of $2(100-p)$ per cent. relative to the double number of poles (2n). The equivalent resistance of the tertiary system is increased by the reduced pitch. The effective value of the current per slot equals the effective value of the current per coil multiplied by $2 \sin \frac{\theta}{2}$, where $\theta$ is equal to the pitch in electrical degrees, that is $180 \times \frac{p}{100}$. The quantity $\sin \frac{\theta}{2}$ is the pitch constant and may be represented by $K_p$. If $K_{p1}$ and $K_{p3}$ represent the pitch constants of the primary and tertiary systems, the resistance of the latter relatively to the former on account of this factor is $$\left(\frac{K_{p1}}{K_{p3}}\right)^2.$$

For example, when $p1$ equals 90%, $p3$ equals $2(100-90)\% = 20\%$. Accordingly, $$\left(\frac{K_{p1}}{K_{p3}}\right)^2 = \left(\frac{\sin 81°}{\sin 18°}\right)^2 = \frac{.978}{.095} = 10.3.$$

Thus, when the pitch of the primary winding with respect to $n$ poles is 90%, the resistance of the tertiary circuit is about ten times greater than the primary resistance, thereby giving high starting torque at the cascade speed.

Fig. 3 represents in conventional form the arrangement of the primary and secondary windings. Three conductors are shown per phase belt and the winding shown is of two-thirds pitch.

The secondary or rotary winding of the motor is represented by S. This secondary winding is composed of two star-connected components $a$—$b$—$c$ and $\bar{a}$—$\bar{b}$—$\bar{c}$, corresponding to the similarly legended phase-belts of the first two rows of Fig. 2. The star-connected component $a$—$b$—$c$ of the secondary winding is permanently short-circuited as indicated by the circle 6. The terminals of the star-connected component $\bar{a}$—$\bar{b}$—$\bar{c}$ of the secondary winding are connected to three slip rings 7. A short-circuiting switch 8 is electrically associated with the slip rings 7, and when this switch is in its closed position both components of the secondary winding coöperate to carry the induced currents, and the winding corresponds to the first legend-diagram of Fig. 2. When the switch 8 is opened, the component $\bar{a}$—$\bar{b}$—$\bar{c}$ is open circuited and electrically inactive, whereby alternate phase-belts of the secondary winding are electrically disconnected from the secondary winding and the active secondary winding corresponds to the second legend-diagram of Fig. 2. With the switch 8 closed, the motor, accordingly, operates as an ordinary $n$-pole induction motor with a short-circuited secondary winding. With the switch 8 open, the motor operates as the equivalent of the cascade combination of $n$ poles and $2n$ poles, and has a synchronous speed of one-third the synchronous speed when the switch 8 is closed. High torque during the cascade operation can be obtained by the use of suitable resistances 5 and by properly proportioning the pitch of the primary winding P as previously explained. Generally, the arrangement of my present invention is limited to cases in which the thermal capacity and heat dissipating power of the stator winding can take care of the total resistance losses. If, however, the reversing and starting duties are too severe to permit of this, the resistances 5 may be external resistances connected between the proper taps brought out from the primary winding. Although I have illustrated an arrangement in which the tertiary currents may flow in locally closed circuits including in whole or in part the main primary winding, it will be evident to those skilled in the art that a separate winding may be provided for the tertiary currents.

I have herein shown and particularly described a certain embodiment of my invention for the purpose of explaining its principle and showing its application, but numerous modifications of the details of construction and arrangement of this embodiment and other applications will present themselves to those skilled in the art. I, therefore, wish to cover by the following claims all modifications within the spirit of the invention.

What I claim as new and desire to secure by Letters Patent of the United States, is:

1. An induction motor having a polyphase primary winding, a secondary winding comprising six phase-belts per pair of primary poles displaced in phase by 60 electrical degrees, a circuit-controlling device, means electrically connecting alternate phase-belts of said secondary winding to said device so that the circuits thereof may be opened or closed by said device, and means whereby said primary winding provides a path for tertiary currents induced therein when alternate phase-belts of the secondary winding are open-circuited by said device.

2. An induction motor having an $n$-pole fractional pitch polyphase primary winding, a secondary winding comprising six phase-belts per pair of primary poles displaced in phase by 60 electrical degrees, a circuit-controlling device, means for electrically connecting alternate phase-belts of said secondary winding to said device so that the circuits thereof may be opened or closed by said device, and means whereby said primary winding produces a path for tertiary currents induced therein when the circuits of said alternate phase-belts of the secondary winding are open circuited by said device.

3. An induction motor having an $n$-pole polyphase primary winding comprising six phase-belts per pair of poles, a secondary winding having two portions, one of which portions is arranged to constitute a winding composed of three phase-belts per pair of poles so that the induced currents flowing therein provide a magnetic field which is electrically equivalent to two polyphase rotating magnetic fields rotating in relatively opposite directions and having $n$-pole and $2n$-pole numbers and the other of which portions is so arranged that it constitutes a winding composed of three phase-belts per pair of poles, the phase-belts of the latter portion being located intermediate the phase-belts of the first portion and the second mentioned portion, when active coöperating with the first mentioned portion to form an $n$-pole winding having six phase-belts per pair of poles, means whereby said primary winding produces a path for induced currents which will produce a field of $2n$-poles, and means for rendering said second mentioned portion active or inactive.

4. An induction motor having an $n$-pole fractional pitch polyphase primary winding comprising six phase-belts per pair of poles, a secondary winding having two portions, one of which portions is arranged to constitute a winding composed of three phase-belts per pair of poles so that the induced currents flowing therein provide a magnetic field which is electrically equivalent to two polyphase rotating magnetic fields rotating in relatively opposite directions and having $n$-pole and $2n$-pole numbers and the other of which portions is so arranged that it constitutes a winding composed of three phase-belts per pair of poles, the phase-belts of the latter portion being located intermediate the phase-belts of the first portion and the second mentioned portion, when active, coöperating with the first mentioned portion to form an $n$-pole winding having six phase-belts per pair of poles, means whereby said primary winding produces a path for induced currents which will produce a field with $2n$-poles, and means for rendering said second mentioned portion active or inactive.

In witness whereof, I have hereunto set my hand this 29th day of May, 1917.

CAMPBELL MACMILLAN.